UNITED STATES PATENT OFFICE.

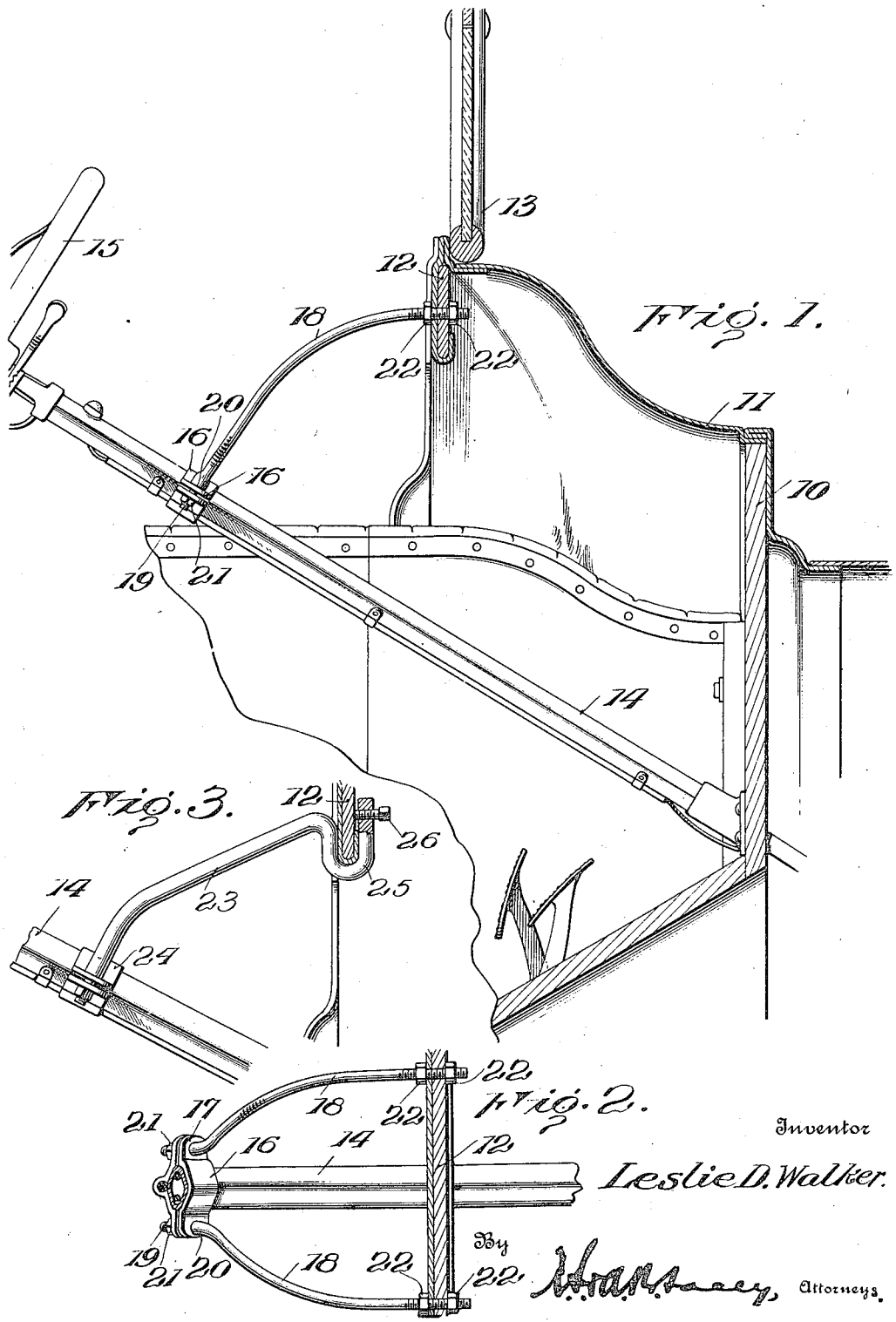

LESLIE D. WALKER, OF CLARINDA, IOWA.

STEERING-POST BRACE.

1,230,245.  Specification of Letters Patent.  Patented June 19, 1917.

Application filed November 3, 1916. Serial No. 130,210.

*To all whom it may concern:*

Be it known that I, LESLIE D. WALKER, a citizen of the United States, residing at Clarinda, in the county of Page and State of Iowa, have invented certain new and useful Improvements in Steering-Post Braces, of which the following is a specification.

This invention relates to an improved steering post brace for motor vehicles and has as its primary object to provide a device of this character adapted for attachment to substantially any conventional type of motor vehicle for bracing the steering post thereof at its free or upper extremity.

The invention has as a further object to provide a brace designed for connection with the cowl of the vehicle to extend between the cowl and the upper extremity of the steering post with the brace attached to the steering post immediately below the steering wheel so as to effectually prevent any swaying of the post when the steering wheel is operated.

And the invention has as a still further object to provide an improved brace of this character which may be easily mounted in position and which, when applied, will not be in the way.

Other and incidental objects will appear as the description proceeds and in the drawings wherein I have illustrated the preferred embodiment of the invention and wherein similar reference characters designate corresponding parts throughout the several views:

Figure 1 is a fragmentary sectional view showing my improved brace applied to a conventional type of motor vehicle and particularly illustrating the disposition of the brace upon the vehicle.

Fig. 2 is a fragmentary plan view with the steering post and cross strip for the vehicle cowl shown in section, this view particularly illustrating the manner in which the brace is connected with the steering post of the vehicle, and Fig. 3 is a fragmentary side elevation showing a slightly modified form of the invention.

In order that the construction, mounting and operation of my improved brace may be accurately understood, I have, in the drawings, shown the device in connection with a conventional type of motor vehicle having a dash 10. Extending from the upper edge of the dash is the cowl 11 which, at its inner extremity, is provided with a cross brace or strip 12. Mounted upon the cowl 11 above and slightly in advance of the said strip is the windshield 13. The steering post 14 of the vehicle projects through the dash 10 in the usual manner and is inclined upwardly and rearwardly within the vehicle to support the steering wheel 15. Coming now more particularly to the subject of the present invention, an attaching member is employed including coacting clips 16. These clips are bowed to fit around the steering post 14 in the manner particularly shown in Fig. 2 and at their extremities are formed with mating lateral ears 17. Extending between the clips 16 and the cross piece 12 of the cowl 11 of the vehicle, are coacting brace rods 18. These rods, at their inner extremities, are formed with reduced terminals 19 defining shoulders 20 at the inner ends thereof and are arranged with the said terminals fitting freely through registering openings in the ears 17 of the clips 16. The terminals 19 are screw threaded for receiving nuts 21 adjustable for clamping the clips 16 about the steering post with the uppermost clip held by the shoulders 20 of the said rods. The brace rods 18 are longitudinally curved outwardly away from each other and upwardly toward the cross strip 12 of the cowl and at their outer extremities project through the said strip at points spaced upon opposite sides of the plane of the steering post 14. The outer extremities of the brace rods are screw threaded to receive clamping nuts 22 confronting opposite sides of the cross strip 12 for holding the said brace rods against longitudinal movement with respect to the said strip while, at the same time, the said nuts are operable for adjusting the brace rods longitudinally with respect to the strip. Consequently, when applying the device to a vehicle, the brace rods 18 may be adjusted for taking up any possible downward play in the steering post.

It will now be observed that the brace rods 18 are arranged to extend between the steering post and the cowl of the vehicle in such manner that the said brace rods will be out of the way. The clips 16 are supported by the said rods to engage the steering post 14 adjacent the free extremity thereof and attention is directed to the fact that the said brace rods are arranged to hold the free end of the steering post against swaying movement in all directions. Consequently, my improved brace will rigidly support the steering post and relieve the said post of any strain when the steering wheel 15 is operated.

It will therefore be seen that I provide a particularly efficient arrangement for the purpose set forth and a brace which may be readily attached to substantially any conventional type of motor vehicle. Furthermore, the brace is of such simple construction that it may be easily applied.

In Fig. 3 of the drawings, I have shown a slight modification of the invention wherein a pair of brace rods 23 are employed. These rods are similar to the rods 18 of the preferred form of the invention and, at their inner extremities, are connected to an attaching member 24 similar to the member 16, the member 24 being arranged around the steering post adjacent its upper extremity. At their outer terminals, the rods 23 are bent upon themselves to provide hooks 25 embracing the lower edge of the cross-piece 12 of the cowl of the vehicle. Screw threaded through the bills of the said hooks to engage the inner side of the said cross piece are set screws 26 rigidly connecting the rods 23 with the cowl. This construction provides an arrangement whereby the brace rods may be connected to the cowl of the vehicle without the necessity of boring holes through the front cross piece of the cowl and by providing the set screws 26, the said rods may be readily attached or detached. Furthermore, the hooks 25 being arranged to extend around the lower edge of the cross piece 12 will rigidly support the rods against longitudinal movement with respect to the said cross piece so that the said rods will, in turn, rigidly support the steering post. While I have shown the set screws 26 arranged adjacent the free extremities of the bills of the hooks 25 still, it will be understood that if preferred, these set screws may be mounted opposite the inner sides of the hooks. This modified form of the invention is otherwise identical with the preferred construction and a further description of the structure is accordingly deemed unnecessary.

Having thus described my invention, what is claimed as new is:

1. A steering post brace for motor vehicles including an attaching member connected with the steering post, and coacting brace rods connected to the said member at opposite sides of the said post and extending upwardly and forwardly therefrom with the outer extremities of the said brace rods attached to the cowl of the vehicle upon opposite sides of the plane of the said post for supporting the post against movement in all directions.

2. A steering post brace for motor vehicles including coacting attaching clips embracing the steering post, brace rods extending through said clips, and means upon the said rods for clamping the clips about the steering post with the said rods attached to the cowl of the vehicle at points spaced upon opposite sides of the plane of the said post.

3. A steering post brace for motor vehicles including a brace rod engaged at one extremity with the steering post and formed at its opposite extremity with a hook engaged with the cowl of the vehicle for supporting the free extremity of the steering post.

4. A steering post brace for motor vehicles including a brace rod engaged at one extremity with the steering post and formed at its opposite extremity with a hook engaging the cowl of the vehicle for supporting the free extremity of the steering post with respect to the cowl, and means adjustable upon the hook for connecting the rod with the cowl.

5. A steering post brace for motor vehicles including a brace rod engaged at one extremity with the steering post and formed at its opposite extremity with a bowed portion engaged with the cowl of the vehicle for supporting the free extremity of the steering post.

In testimony whereof I affix my signature.

LESLIE D. WALKER. [L. S.]